United States Patent Office 3,052,829
Patented Sept. 4, 1962

3,052,829
ELECTROLYTIC CAPACITOR
Sidney D. Ross, Raymond C. Petersen, and Manuel Finkelstein, Williamstown, Mass., assignors to Sprague Electric Company, North Adams, Mass., a corporation of Massachusetts
No Drawing. Filed Apr. 5, 1960, Ser. No. 20,031
12 Claims. (Cl. 317—230)

This invention relates to electrolytes for electrolytic capacitors and more particularly to non-pressure-producing electrolytes. This application is a continuation-in-part of our copending applications S.N. 702,811 filed December 16, 1957, and S.N. 744,685, filed June 26, 1958; both parent applications being abandoned after the filing of this application.

Electrolytes for electrolytic capacitors are subject to current flow resulting from the attraction of ions to the electrodes of the capacitor. The ions are discharged at the electrodes producing hydrogen or other gases at the cathode. The production of hydrogen as a result of the discharge of hydrogen ions at the capacitor cathode is the major cause of gas production in electrolytic capacitors. This gas product is undesirable at it produces internal pressures within the capacitor. These pressures within the capacitor-can may cause the rupture of the can with injurious results. Such conditions require the incorporation of vents and safety blowouts in capacitor constructions and these alleviating devices in turn are objectionable. It is, therefore, desired to avoid gas production and particularly hydrogen production within the capacitor as a result of the discharge of ions at the electrodes.

Electrolytes for electrolytic capacitors are contained within a container such as a capacitor can. It is desirable that the operation of the electrolytic capacitor be continued over long periods of time and for that reason it is undesirable for a gas to be produced and accumulated within the capacitor can. The capacitor can is tightly sealed to prevent infiltration of foreign substances into the capacitor electrolyte or the egress and loss of the electrolyte from the capacitor can. A gas produced within the can in any substantial quantity results in an internal pressure which may lead to rupture of the can.

The cathodic process which produces gases at the cathode involves the neutralization of a positive ion at the cathode, which ion upon taking up an electron results in a radical. The primary radical thus produced then enters into a subsequent reaction to produce a stable product which usually is a gas. This resultant gaseous product when built up in volume over a period of capacitor operation will eventually result in undesirable pressures and bursting of the capacitor container. For example, the positive hydrogen ions present in electrolytes migrate through the capacitor electrolyte toward the capacitor cathode. At the capacitor cathode the hydrogen ion loses its charge by picking up an electron and it becomes a radical having one unshared electron. Two of these hydrogen radicals will readily combine to form a stable hydrogen molecule. This gaseous hydrogen accumulating within the capacitor necessitates an alleviating device to avoid destructive pressures.

Hydrogen gas may be produced within the capacitor also by the production of a hydrogen-containing radical from which the hydrogen separates to combine and form gaseous molecular hydrogen. For example, an ammonium ion may be converted to an ammonium radical and from this ammonium radical hydrogen will readily separate. Ions of metals positioned above hydrogen in the electromotive series will similarly be discharged at the cathode to produce hydrogen in an aqueous electrolyte through the reaction of the metal radical with water.

It is an object of this invention to provide an electrolyte for an electrolytic capacitor which does not create undesirable gaseous pressures within the electrolytic capacitor.

It is a further object of this invention to provide an electrolytic capacitor in which gaseous pressure is not accumulated.

It is an object of this invention to provide a cation in a capacitor electrolyte which is neutralized at an electrolytic capacitor cathode to form a relatively stable radical, said cation being dischargeable at a small negative potential.

It is a further object of this invention to provide an electrolytic capacitor electrolyte with a cation which forms a radical having resonance after discharge at the capacitor cathode.

It is a still further object of this invention to provide a capacitor electrolyte having a cation which contains the cinnamyl radical.

These and other objects of this invention will become more apparent upon consideration of the following description.

The present invention is based on the discovery that an electrolyte in which hydrogen formation is not a major product of the cathodic reaction will not develop undesirable gas pressures.

The electrolyte of this invention is one in which the discharge of cations at the cathode does not result in hydrogen formation. The cation of this invention produces a primary radical, which primary radical upon cleavage results in a product which is not hydrogen forming. This primary radical is made up of an element substituted by organic radicals, such as alkyl, aryl, and aralky radicals. Appropriate groups of compounds of this discovery are those forming ammonium, sulfonium, phosphonium, arsonium and stibonium cations. These compounds are contained in the electrolyte in the form of an appropriate salt. A primary radical is formed from the cation in the electrolyte. This primary radical formed at the cathode may contain a group which is readily subject to cleavage. It is a feature of this invention that this most readily cleaved group forms a relatively stable radical after cleavage.

As indicated in our above-mentioned copending applications, the capacitor electrolytes disclosed therein minimize gas production and particularly hydrogen gas production within a capacitor can. In the cathodic process the neutralization of a positive ion at the cathode results in the production of a radical. In the electrolytes of our above-mentioned applications, the radical produced by this neutralization results in a stable product which is not a gas and is not hydrogen-forming. In a capacitor electrolyte it is particularly desirable that the positive ion which is attracted to the cathode be discharged at the cathode by a smaller negative potential than that required for the discharge of a hydrogen ion. Thus, the discharge of this cation in the capacitor is more likely than the discharge of hydrogen ions in the same capacitor. Said cation will be discharged at the cathode in preference to hydrogen ion. The free radical produced by the discharge of the ion at the cathode must be relatively stable. The stability of this radical is a factor determining the potential at which the cation will discharge at the cathode. The stability of the radical is in turn determined by the chemical resonance of the radical.

The positive ion of the electrolyte compound of this invention is made up so as to contain groups which cleave to give free radicals in the manner generally described above. The full scope of this invention involves cations which when discharged at the cathode of the electrolyte capacitor will not result in hydrogen formation or will not result in pressure-producing gas formation. These cations are characterized by the fact that they complete favorably with hydrogen ions in the cathodic reaction in the electrolyte in which they are contained. Thus, the electrolysis that takes place at the cathode will discharge the cations of this invention in preference to hydrogen ions and at the same time will not form other pressure-producing matter.

One class of cations found to be useful according to this invention are quaternary ammonium ions. Quaternary ammonium ions are discharged at the cathode according to the following process:

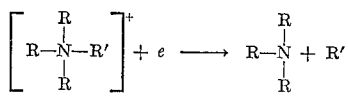

The process at the cathode produces from this ion a tertiary amine, and the relatively stable radical R'. Generally it may be assumed that the radical which is separated is the group on the quaternary ammonium ion which forms the most stable radical when separated. The most stable radical is the radical most capable of resonance stabilization.

It has been found that the cinnamyl radical is particularly stable upon the discharge of a cation containing the radical from an electrolyte at the cathode of an electrolytic capacitor. The cinnamyl radical may be incorporated in a cation of an electrolytic capacitor electrolyte. In this electrolyte the cation containing the cinnamyl radical will discharge at the cathode at a smaller negative potential than that required for the discharge of a hydrogen ion at the cathode. Upon discharge of the cinnamyl radical containing cation at the cathode the cinnamyl radical will separate from the discharged ion by cleavage to form a free radical. This cinnamyl radical is not gas forming in the electrolyte, but combines with a hydrogen atom to form a liquid product.

A cinnamyl triethyl ammonium salt of boric acid has been prepared, since ammonium salts of boric acid are commonly used in electrolytes of electrolytic capacitors. The cinnamyl triethyl ammonium ion is represented by the following formula:

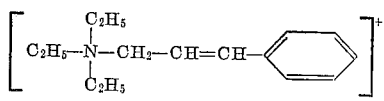

The cinnamyl radical provides the cation with its low negative discharge potential. The cathodic reaction involved in the discharge of this ion at the cathode may be illustrated as follows:

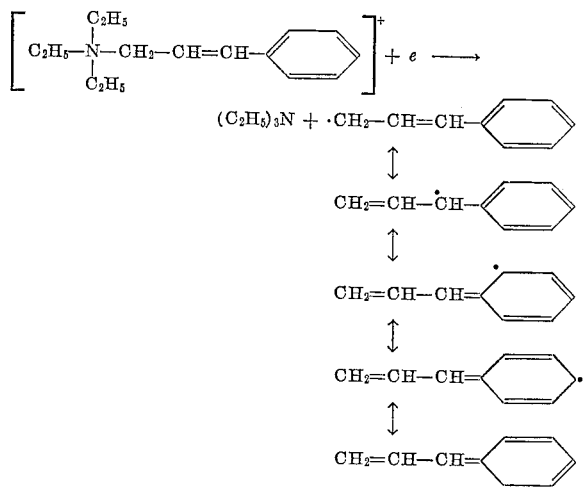

In this reaction the reaction products formed at the cathode are the liquid triethyl amine and the cinnamyl radical, for which five resonance structures are shown. It is the existence of these resonance structures which gives this radical its relatively high stability. The cinnamyl radical thus formed eventually combines with a hydrogen atom to form a permanently liquid product.

Examples of cleavage of quaternary ammonium ions producing stable radicals are indicated as follows:

(2)

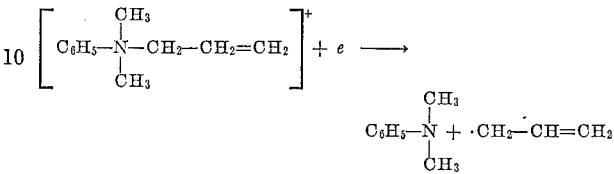

The allyl dimethyl anilinium ion has been found to be especially effective in this invention. The allyl radical is a resonance stabilized radical and accordingly separates eventually to form propylene. Propylene, while a gas, is sufficiently soluble in the solvents of interest to prevent the building up of gas pressure within the capacitor.

(3)

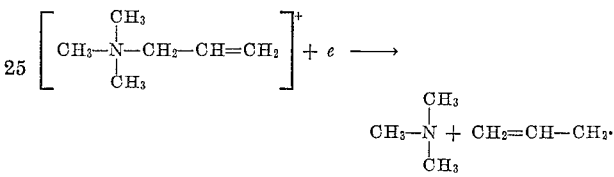

The product of the cathodic reaction are trimethylamine and the resonance stabilized allyl radical.

(4)

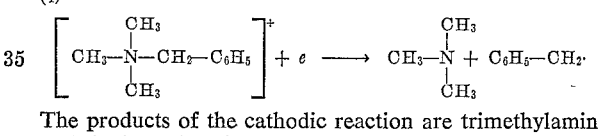

The products of the cathodic reaction are trimethylamine and the benzyl radical.

(5)

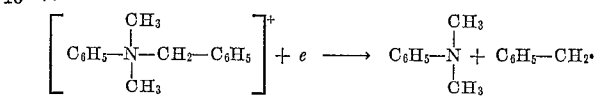

The products of the cathodic reaction are dimethylaniline and the benzyl radical.

It is seen in the above examples of quaternary ammonium cation cleavage that in each case an organic group is split off from the nitrogen element to form a radical capable of resonance stabilization. Further, the resonance stabilized radical eventually forms non-pressure producing products.

The quaternary ammonium salt used as an electrolyte in this invention may be any quaternary ammonium salt which meets the requirements and objectives of the electrolyte. Thus, this invention encompasses all quaternary ammonium salts as electrolytes. The invention is not limited to quaternary ammonium salts or compounds producing quaternary ammonium cations. Salts and compounds which may be employed in the electrolyte of this invention include phosphonium, stibonium, arsonium and sulfonium cations, carrying alkyl, aryl and/or aralkyl groups, and form non-pressure-producing matter in the cathodic reaction.

In work leading to this discovery, a great many salts were electrolyzed in various solvents using both platinum and aluminum cathodes. Three sets of such experiments are described below. Platinum cathodes were used in some electrolyses because hydrogen overvoltage is smallest on platinum, and the discharge of hydrogen ions is thereby favored. Any success in reducing hydrogen formation at a platinum cathode guarantees greater success using other metal cathodes. Aluminum cathodes were used in other experiments since aluminum is a common cathode material in electrolytic capacitors. Water was used as a solvent in some of these electrolyses. Water is significant because it serves as a large source of hydrogen ions, thus favoring the production of hydrogen more than does any other solvent.

In one set of experiments, solutions containing the allyl dimethyl anilinium ion in water were electrolyzed in aqueous solution using both platinum and aluminum cathodes. With a platinum cathode, about 50% of the current went into production of propylene, the remainder producing hydrogen, while with our aluminum cathode 75% of the current produced propylene. Propylene, while a gas, is quite soluble in water and far more soluble in most organic liquids. Solutions of this salt in various organic solvents were electrolyzed with no observable gas formation while the charge passed in some of these cases was equivalent to that passed by an ordinary capacitor over thousands of hours of operation. Many different quaternary ammonium ions containing the allyl radical were electrolyzed under similar conditions with the same qualitative results. Solutions containing the tetraallyl ammonium ion have been electrolyzed with almost no gas production under the most disadvantageous conditions, using a platinum cathode in aqueous solution.

In another set of experiments, aqueous solutions containing the fluorenyl trimethyl ammonium ion were electrolyzed at both platinum and aluminum cathodes with a large fraction of the current being used in the production of fluorene, a solid material which is insoluble in water but appreciably soluble in many organic solvents.

In the third set of experiments, aqueous solutions containing trimethyl-1-acenaphthenyl ammonium ion were electrolyzed at both platinum and aluminum cathodes. In these electrolyses, a large fraction of the current was utilized in producing acenaphthene, a solid material which can be expected to be reasonably soluble in organic solvents.

The gas producing tendency of electrolyte cations may be recognized by determining the current efficiency for gas production in an electrolysis. This is determined by measuring the amount of gas produced at a cathode during an electrolysis and dividing the amount of gas actually produced by the amount of gas which might have been produced had all of the current resulted in the production of gas. In this calculation it is assumed that a maximum of one mole of gas could be produced for two equivalents of charge, according to the equation $$2H^+ + 2e^- \rightarrow H_2$$

This method of determining the gas producing tendency of an electrolyte was employed in an electrolysis cell having an aluminum cathode.

The following examples set forth the current efficiencies for the production of gas at the indicated current densities in a capacitor containing a solution of 0.038 mole of the cinnamyl triethyl ammonium borate salt in 83 grams of ethylene glycol which was electrolyzed at the indicated current densities.

|  | Current Density (ma./cm.²) | Current Efficiency For Gas Production |
| --- | --- | --- |
| Example I | 1.45 | 0.65 |
| Example II | 0.54 | 0.61 |
| Example III | 0.29 | 0.46 |
| Example IV | 0.13 | 0.35 |
| Example V | 0.05 | 0.06 |

It is thus shown that the current efficiency decreases rapidly with a decrease in current density. At a current density of 0.05 ma./cm.², only 6% of the current was used in the production of gas. It should be observed that the current density of 0.05 ma./cm.² is greater than would be expected in normal capacitor operation. Therefore, it appears that even less than 6% of the total possible gas will actually be produced in normal capacitor operation.

The following example is illustrative of the gas minimizing properties of the electrolyte of this invention.

*Example VI*

A solution of 0.038 mole of the cinnamyl triethyl ammonium borate was dissolved in 83 grams of water. The resultant electrolyte solution was electrolyzed in a cell having an aluminum cathode and the amount of gas produced at the cathode was measured. A current having a density of 1 ma./cm.² was passed through the solution. A gas was collected at the cathode. It was calculated that the amount of gas actually produced at the cathode was 9% of the total possible gas producible. A current of 0.25 ma./cm.² was passed through the cell and gas was collected at the cathode. It was calculated that the amount of actual gas produced was 7% of the maximum gas producible by the charge passed through the cell.

It thus appears that the proportion of gas produced by the electrolyte of this invention is even less in an aqueous solution than in an ethylene glycol solution.

A further demonstration of the outstanding properties of the electrolyte of this invention is illustrated in the following example:

*Example VII*

A solution of the cinnamyl triethyl ammonium borate in N,N-di methylacetamide was prepared. The resultant electrolyte was electrolyzed in a cell having an aluminum cathode by a current passed through the cell and the cathode. Upon electrolyzing the solution at a current density of 1 ma./cm.² no gas production was observed.

It is thus apparent that with the electrolyte of this invention it is possible to provide an electrolytic capacitor in which no gassing will take place at the cathode.

In the above description an electrolyte solute of cinnamyl triethyl ammonium borate salt has been described in the specific examples. It will be understood that other nongassing electrolytes can be prepared from solutes having the cinnamyl triethyl ammonium cation combined with other suitable anions to form an electrolyte solute. Further, the quaternary ammonium ion has been described as substituted with three ethyl groups. The ethyl groups may be replaced by other organic radicals. Further modifications of this invention are possible. For example, the electrolyte solute is not limited to ammonium ions. The cinnamyl radical can be substituted into other suitable cations to render them dischargeable at the electrolytic capacitor at a negative potential which is smaller than that required for the discharge of hydrogen ions. Such suitable cations might include the phosphonium, stibonium and arsonium ions.

The advantages of the electrolyte of this invention are similar to those set forth in connection with the electrolytes disclosed in our above-mentioned co-pending applications. These include the above-mentioned reduction of the discharge of hydrogen ions and resultant gas production. Of particular significance is the reduction of gas production in a water solvent, because water is a rich source of hydrogen ions and the minimization of hydrogen production in a water solvent is an outstanding achievement. The minimization of gas production is advantageous in reducing internal pressures within the capacitor and thereby providing an increased capacitor life.

It will be understood that the above described embodiments and illustrations have been set forth for the purpose of assisting in an understanding of the breadth of this invention and that it is intended that further modifications may be made without departing from the spirit of the invention, the scope of which is defined by the appended claims.

What is claimed is:

1. In combination an electrolytic capacitor, a cathode and an anode of said electrolytic capacitor, and an electrolyte in said capacitor having anions and cations and a solvent therefor, said cations of said electrolyte having the formula

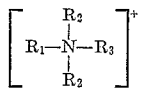

wherein $R_1$ is from the group consisting of phenyl and alkyl to $C_4$, $R_2$ is alkyl to $C_4$, and $R_3$ is from the group consisting of allyl, benzyl, substituted allyl, and substituted benzyl, said cation being dischargeable at said cathode in preference to hydrogen ion by virtue of the fact that the $R_3$ free radical product of such discharge is resonance stabilized.

2. An electrolytic capacitor electrolyte having anions, cations and a solvent therefor, said cation of the formula

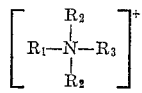

wherein $R_1$ is from the group consisting of phenyl and alkyl to $C_4$, $R_2$ is alkyl to $C_4$, and $R_3$ is from the group consisting of allyl, benzyl, substituted allyl, and substituted benzyl.

3. The electrolyte as in claim 2 wherein $R_3$ of the cation is $CH_2-CH=CH_2$.

4. The electrolyte as in claim 2 wherein $R_3$ of the cation is $C_6H_5-CH_2$.

5. An electrolytic capacitor electrolyte of anions and cations and a solvent therefor, said electrolyte including a cation of allyl dimethyl anilinium.

6. An electrolytic capacitor electrolyte of anions and cations and a solvent therefor, said electrolyte including a cation of allyl trimethyl ammonium.

7. An electrolytic capacitor electrolyte of anions and cations and a solvent therefor, said electrolyte including a cation of benzyl trimethyl ammonium.

8. An electrolytic capacitor electrolyte of anions and cations and a solvent therefor, said electrolyte including a cation of benzyl dimethyl anilinium.

9. An electrolytic capacitor electrolyte consisting essentially of a solute having an electrolyte anion and a cation of the formula

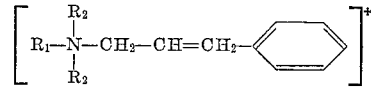

wherein $R_1$ is from the group consisting of phenyl and alkyl to $C_4$ and $R_2$ is an alkyl to $C_4$, and a solvent capable of dissociating said solute.

10. An electrolytic capacitor electrolyte consisting essentially of a solute having an electrolyte anion and a cation of cinnamyl triethyl ammonium, and a solvent capable of dissociating said solute.

11. The electrolytic capacitor electrolyte of claim 9 wherein said electrolyte anion is a borate.

12. The electrolytic capacitor electrolyte of claim 10 wherein said electrolyte anion is a borate.

References Cited in the file of this patent

UNITED STATES PATENTS

| | | |
|---|---|---|
| 2,256,959 | Muskat | Sept. 23, 1941 |
| 2,383,775 | Craig et al. | Aug. 28, 1945 |
| 2,609,392 | Crossley | Sept. 2, 1952 |
| 2,759,132 | Ross | Aug. 14, 1956 |
| 2,877,228 | Mahan | Mar. 10, 1959 |

UNITED STATES PATENT OFFICE
CERTIFICATE OF CORRECTION

Patent No. 3,052,829                                  September 4, 1962

Sidney D. Ross et al.

It is hereby certified that error appears in the above numbered patent requiring correction and that the said Letters Patent should read as corrected below.

Column 2, line 34, for "aralky" read -- aralkyl --; column 3, line 3, for "complete" read -- compete --; column 6, line 51, after "capacitor" insert -- cathode --.

Signed and sealed this 5th day of February 1963.

(SEAL)
Attest:

ERNEST W. SWIDER
Attesting Officer

DAVID L. LADD
Commissioner of Patents